(12) United States Patent
Winokur

(10) Patent No.: US 9,703,649 B2
(45) Date of Patent: Jul. 11, 2017

(54) AUTOMATIC FAILOVER AND FAILBACK BETWEEN PRIMARY AND SECONDARY STORAGE SYSTEMS

(71) Applicant: Infinidat LTD., Herzliya (IL)

(72) Inventor: Alex Winokur, Ramat Gan (IL)

(73) Assignee: INFINIDAT LTD., Herzliya (IL)

( * ) Notice: Subject to any disclaimer, the term of this patent is extended or adjusted under 35 U.S.C. 154(b) by 148 days.

(21) Appl. No.: 14/574,416

(22) Filed: Dec. 18, 2014

(65) Prior Publication Data

US 2016/0179637 A1    Jun. 23, 2016

(51) Int. Cl.
G06F 11/00 (2006.01)
G06F 11/20 (2006.01)
G06F 13/42 (2006.01)

(52) U.S. Cl.
CPC ...... *G06F 11/2005* (2013.01); *G06F 13/4221* (2013.01); *G06F 2201/85* (2013.01)

(58) Field of Classification Search
USPC ........................................................ 714/45
See application file for complete search history.

(56) References Cited

U.S. PATENT DOCUMENTS 8,028,192 B1 * 9/2011 Kekre ................ G06F 11/1662
714/13
2005/0188243 A1 * 8/2005 Adams .................... H04L 45/00
714/4.1

\* cited by examiner

*Primary Examiner* — Sarai Butler
(74) *Attorney, Agent, or Firm* — Reches Patents

(57) ABSTRACT

A method for managing a secondary storage system, the method may include performing a failover update, by the secondary storage system, of a status of at least one secondary path that couples a host computer to the secondary storage system thereby causing the host computer to prioritize sending IO requests to the secondary storage system over sending the IO requests to a primary storage system; wherein the failover update is triggered by a determination made by the secondary storage system that (a) the secondary storage system is, when making the determination, at an acceptable synchronization level with the primary storage system, and (b) the primary storage system is disconnected from the host computer; receiving, from the host computer, IO requests; and responding, by the secondary storage system, to the IO requests.

19 Claims, 6 Drawing Sheets

AUTOMATIC FAILOVER AND FAILBACK BETWEEN PRIMARY AND SECONDARY STORAGE SYSTEMS

BACKGROUND

Mirroring between storage systems, where primary volumes at a primary storage system also known as local storage system) storage system are replicated synchronously or asynchronously to secondary volumes at a secondary storage system (also known a remote storage system), is often used to protect against storage failure.

When a primary volume (or the entire primary storage system) fails, a system administrator (human) needs to reassign the secondary volume to the host computer, to set the applications (which may fail due to time out) to online state and resume work from an unknown state, since the applications may have written data to cache before being written to the storage, data which may be lost.

In addition to the intervention required in the host computer, the secondary storage system cannot automatically switch roles with the primary storage system. This is because the secondary storage system cannot determine whether it lost connection with the primary storage system due to communication failure (failed communication with the secondary storage system only) or due to failure of the primary storage system. In the former case, the primary storage system may be still operational and if the secondary storage system would take over, it can cause a situation known as "split brain", where two non-synchronized storage systems independently provide input/output (IO) services of inconsistent data. Therefore, a system administrator is required for switching the roles between the two storage systems. Such a failover procedure is very disruptive to the normal operation.

SUMMARY

According to an embodiment of the invention there may be provided a method for managing a secondary storage system, the method may include: performing a failover update, by a secondary storage system, of a status of at least one secondary path that couples a host computer to the secondary storage system thereby causing the host computer to prioritize sending IO requests to the secondary storage system over sending the IO requests to a primary storage system; wherein the failover update is triggered by a determination made by the secondary storage system that (a) the secondary storage system is, when making the determination, at an acceptable synchronization level with the primary storage system, and (b) the primary storage system is disconnected from the host computer; receiving, from the host computer, IO requests; and responding, by the secondary storage system, to the IO requests.

The failover update may be performed autonomously and without human intervention.

The method may include performing the determination that (a) the secondary storage system is, when making the determination, at the acceptable synchronization level with the primary storage system, and (b) the primary storage system is disconnected from the host computer.

The determining that the primary storage system is disconnected from the host computer may be based upon a reception, before performing of the failover update, of an initial IO request from the host computer, wherein the initial IO request is expected to reach the secondary storage system when the primary storage system is disconnected from the host computer.

The updating of the status of the at least one secondary path may include indicating that the at least one secondary path is active and of a higher priority than a priority of at least one primary path that couples the host computer to the primary storage system.

The method further may include preventing, from the host computer, to send the IO requests to the secondary storage system when determining that the secondary storage system did not maintain the acceptable synchronization level with the primary storage system when the primary storage system disconnected from the secondary storage system.

The preventing may include flagging the at least one secondary path as being inactive.

The method may include performing a failback update, by the secondary storage system, of the status of the at least one secondary path thereby causing the host computer to prioritize sending new IO requests to the primary storage system over sending the new IO requests to the secondary storage system; wherein the performing of the failback update is triggered by a determination made by the secondary storage system that the primary storage system is connected to the secondary storage system and that the primary storage system is capable of responding to the new IO requests.

The performing of the failback update may include informing the host computer about a prioritization of the at least one primary path over the at least one secondary path after the primary storage system completed a failback change in the status of the at least one primary path.

According to an embodiment of the invention there may be provided a non-transitory computer readable medium may store instructions that once executed by a secondary storage system cause the secondary storage system to: perform a failover update, by a secondary storage system, of a status of at least one secondary path that couples a host computer to the secondary storage system thereby causing the host computer to prioritize sending IO requests to the secondary storage system over sending the IO requests to a primary storage system; wherein the failover update is triggered by a determination made by the secondary storage system that (a) the secondary storage system is, when making the determination, at an acceptable synchronization level with the primary storage system, and (b) the primary storage system is disconnected from the host computer; receive, from the host computer, IO requests; and respond, by the secondary storage system, to the IO requests.

The failover update may be performed autonomously and without human intervention.

The non-transitory computer readable medium may store instructions for performing the determination that (a) the secondary storage system is, when making the determination, at an acceptable synchronization level with the primary storage system, and (b) the primary storage system is disconnected from the host computer.

The non-transitory computer readable medium may store instructions for determining that the primary storage system is disconnected from the host computer based upon a reception, before performing of the failover update, of an initial IO request from the host computer, wherein the initial IO request is expected to reach the secondary storage system when the primary storage system is disconnected from the host computer.

The non-transitory computer readable medium may store instructions for updating of the status of the at least one secondary path by indicating that the at least one secondary path is active and of a higher priority than a priority of at least one primary path that couples the host computer to the primary storage system.

The non-transitory computer readable medium may store instructions for preventing from the host computer to send the IO requests to the secondary storage system when determining that the secondary storage system did not maintain the acceptable synchronization level with the primary storage system when the primary storage system disconnected from the secondary storage system.

The non-transitory computer readable medium may store instructions for preventing from the host computer to send the IO requests to the secondary storage system by flagging the at least one secondary path as being inactive.

The non-transitory computer readable medium may store instructions for performing a failback update of the status of the at least one secondary path thereby causing the host computer to prioritize sending new IO requests to the primary storage system over sending the new IO requests to the secondary storage system; wherein the performing of the failback update is triggered by a determination made by the secondary storage system that the primary storage system is connected to the secondary storage system and that the primary storage system is capable of responding to the new IO requests.

The non-transitory computer readable medium may store instructions for performing of the failback update by informing the host computer about a prioritization of the at least one primary path over the at least one secondary path after the primary storage system completed a failback change in the status of the at least one primary path.

According to an embodiment of the invention there may be provided a storage system that may include a controller and an interface; wherein the controller may be configured to perform a failover update of a status of at least one secondary path that couples a host computer to the secondary storage system thereby causing the host computer to prioritize sending IO requests to the secondary storage system over sending the IO requests to a primary storage system; wherein the failover update is triggered by a determination made by the secondary storage system that (a) the secondary storage system is, when making the determination, at an acceptable synchronization level with the primary storage system, and (b) the primary storage system is disconnected from the host computer; wherein the interface is arranged to receive, from the host computer, IO requests; and wherein the storage system may be configured to respond to the IO requests.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
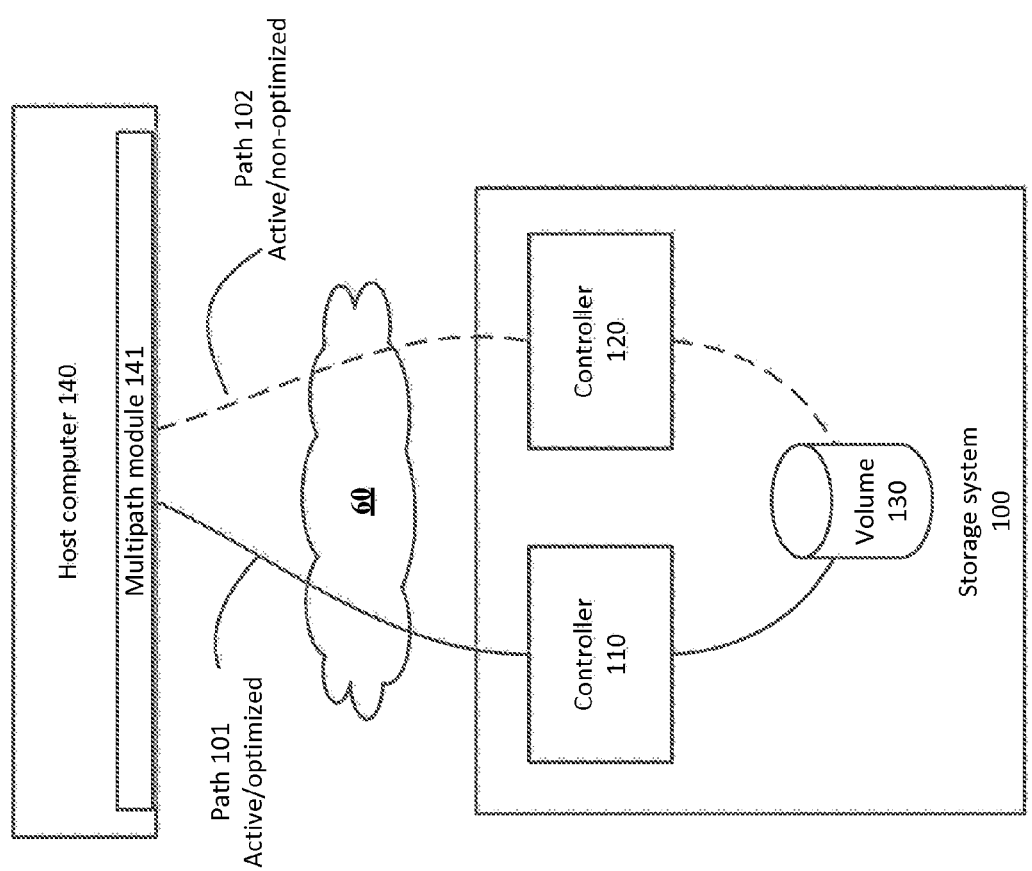
FIG. 1 illustrates a host computer and a storage system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

In the following text it is assumed that a host computer communicates with a primary and a secondary storage systems according to the Small Computer System Interface (SCSI) protocol. This is only a non-limiting example and the host computer may communicate with either one of the primary storage system and a secondary storage system using any communication protocol.

A path (also known as ITL, acronym for Initiator-Target-LUN) between a host computer and a logical volume in the storage system is determined by multiple hardware components such as the host port (initiating port), the storage port (target port) through which the logical volume is accessible to the host and some intermediate storage area network (SAN) entities, such as Fibre-Channel switches or IP routers. There are primary paths between the host computer and the primary storage system and there are secondary paths between the secondary storage system and the host computer.

To maintain an uninterrupted redundant connection between a host computer and primary and secondary storage systems connected to the host computer, the host computer may employ a technique called multipathing, which enables the host computer to use multiple paths between the host computer and each logical volume exposed to the host computer.

The host computer may host a multipathing module that selects the best possible path for transferring IO requests to a logical volume (LUN) hosted in the primary and/or secondary storage systems. In case of a failure of any element in the SAN network, such as an adapter, switch, or cable, which affects the path being used to access a certain volume, the multipathing module can switch to an alternate path configured for the volume.

SCSI-4 Asymmetric Logical Unit Assignment (ALUA) is a multipathing method that uses access states including an active and optimized state, an active and non-optimized state, a standby state, and an unavailable state. These access states are reported to the host computer via a SCSI command.

A path associated with an active and optimized state is prioritized over a path associated with an active and non-optimized state. IO requests will not be sent over a path that is associated with standby or unavailable state.

Suppose a case where a primary storage system includes two (or more) local controllers, but only one of them is defined as a primary controller with regard to the specific local logical volume (and is responsible for controlling IO requests to that logical volume) and one is regarded as a secondary controller. In this case and when implementing ALUA, the paths that pass through the primary controller are defined as having access state of "active and optimized" while paths that pass through the secondary controller are defined as having access state of active and non-optimized.

ALUA allows the storage system to indicate to a host computer, which paths to the storage system are preferred, on both a port by port basis and a volume by volume basis. The storage ports associated with paths that have the same access state can be grouped and their access state can be reported as a group. The host computer can learn the access state of the paths it connects to by sending the Report Target Port Groups SCSI inquiry command to the storage system, which returns a list of target port groups, with access state and the list of target ports for each target port in the group. Referring to FIG. 1—host computer 140 includes a multipath module 141 that allows the host computer to determine whether to communicate with storage system 100 via path 101 or path 102. FIG. 1 illustrates path 101 as being in an active and optimized state and thus is the preferred path—as path 102 is being in an active and non-optimized state. Path 101 is coupled (via network 60) to controller 110 of storage system 100, path 102 is coupled (via network 60) to controller 120 of storage system 100. Both controllers 110 and 120 may access volume 130 of storage system 100.

In normal operation the host computer will be accessing a certain volume only through the paths set to active and optimized state for that volume. Only if all active and optimize paths fail, the host computer will access through the paths set to active and non-optimized state.

According to various embodiments of the invention there are provided storage systems, methods and non-transitory computer readable medium for allowing a failover from a local (primary) storage system to a remote (secondary) storage system in case of a failure of the primary storage system, and a failback from the secondary storage system back to the primary storage system when the primary storage system recovers.

The terms failover and failback will be collectively denoted as 'transitions' or 'role transitions' hereinafter.

The failover and failback may be executed in a seamless manner, without human intervention. The failover may be triggered by the secondary storage system. The failback may be triggered by the secondary and/or primary storage system.

Each one of the primary and secondary storage system may be a vast storage system that may store more than 50, 100, 200 Terabytes of information.

A primary storage system failure, from the host computer perspective, can be of the entire primary storage system or of network connectivity between the primary storage system and the host computer that accesses volumes provided by the primary storage system. In both cases the primary storage system cannot provide access to the host computer. In case of a primary storage system failure, the role transition is applied for all volumes in the primary storage system (or at least applied to all volumes defined as mirrored, or all volumes defined to be seamlessly transitioned).

The transition is seamless not only at the host computer side, but also at the secondary and/or primary storage system side. No involvement of a human system administrator is required in order to perform or initiate the transition, neither at the host computer side nor at the storage side, and no special software is required to be installed at the host computer side, except for the standard multipathing software.

It is assumed that the host computer hosts the applications that use the storage, is connected to both the primary storage system and the secondary storage system, wherein volumes at a primary storage system are synchronously replicated to the secondary storage system (or at least near-real-time asynchronously replicated). It is also assumed that the host computer includes a multipathing module that is capable of seamlessly switching between paths associated with the same volume. It is assumed that the multipathing module prefers using paths whose access state is 'active and optimized' over paths whose access state is 'active and non-optimized', and that the latter paths are used when none of the 'active and optimized' paths is accessible.

In the following description the term 'volume' can refer to either a physical device, a partition within a device, a logical entity provided to the host computer, whose logical addresses are mapped to one or more physical devices or portions thereof or to stripes of RAID groups, etc.

Paths associated with primary volumes, i.e., volumes within the primary storage system are set to active and optimized state. The paths associated with primary volumes in the primary storage system can be grouped and constitute a group ("target port group" in ALUA standard) that is set to active and optimized state. Paths associated with secondary volumes, i.e., volumes in the secondary storage system, are set to active and non-optimized state. The paths associated with secondary volumes in the secondary storage system can be grouped and constitute a group that is set to active and non-optimized state.

When a primary volume is assigned to a host computer by a storage administrator, all the paths that are configured from the host computer to the primary volume are automatically set to active and optimized state, or alternatively, all paths are associated by the primary storage system with a target port group that is defined in active and optimized state.

When a secondary volume in the remote system is provisioned to the primary volume by a storage administrator for mirroring the primary volume, the remote system defines all the paths from the host computer to that secondary volume as having the access state "active and non-optimized". In addition, the secondary volume should appear to the host computer and identified to the host computer as if it is the same volume as the primary volume.

In order for manipulating the host computer to view the primary volume and the secondary volume as a single volume and not as two separate distanced volumes, the secondary volume should identify itself to the host computer as having the same attributes as the primary volume. Thus, there are certain commands related to volume attributes initiated by the host computer that should be responded in the same way, whether the command is issued on the paths connecting the host computer to the primary storage system or issued on paths connecting the host computer to the secondary storage.

For example when the inquiry SCSI command is issued from the host computer to the secondary storage system, the returned response should be identical to a response that would have been provided by the primary storage system for the respective primary volume. These responses are related to inquiries regarding e.g., the device type, volume name, serial number, version, vendor's identification, model number and other information as defined by the standard.

In order to enable the secondary volume to identify itself as if it is the primary volume, some attributes of the primary volume should be transferred to the secondary system, via, e.g., a replication link connecting the two storage systems. These attributes are associated with the secondary volume such that when an inquiry command is issued on the target port belongs to the secondary storage, a response will return the same results as those would be issued by the corresponding primary volume in the primary storage system. The transfer of the identification information may be executed by the replication modules 241 and 281 of the primary and secondary storage systems.

In addition, all reservation information applied to the primary volumes (using SCSI reserve commands and release commands, for exclusive usage of the volumes by the requesting entity), need to propagate to the remote site such that if the primary storage fails and a seamless failover to the secondary storage system occurs, the secondary volumes that are replication of reserved primary volumes, will also be reserved. This is accomplished by propagating the reserve and release commands to the secondary storage system, exactly in the same way as all other write commands are propagated to the secondary storage system. The transfer of the reservation information may be executed by the replication modules 241 and 281 of the primary and secondary storage systems.

The host computer can learn the access state of the paths it connects to by executing the Report Target Port Groups SCSI command.

Normal Operation

In normal operation, where the primary storage system is operational and connected to the host computer and the specific volume to be accessed is functioning, the host computer will be accessing the active and optimized paths and therefore, will automatically access only the primary storage system.

Figure 2:
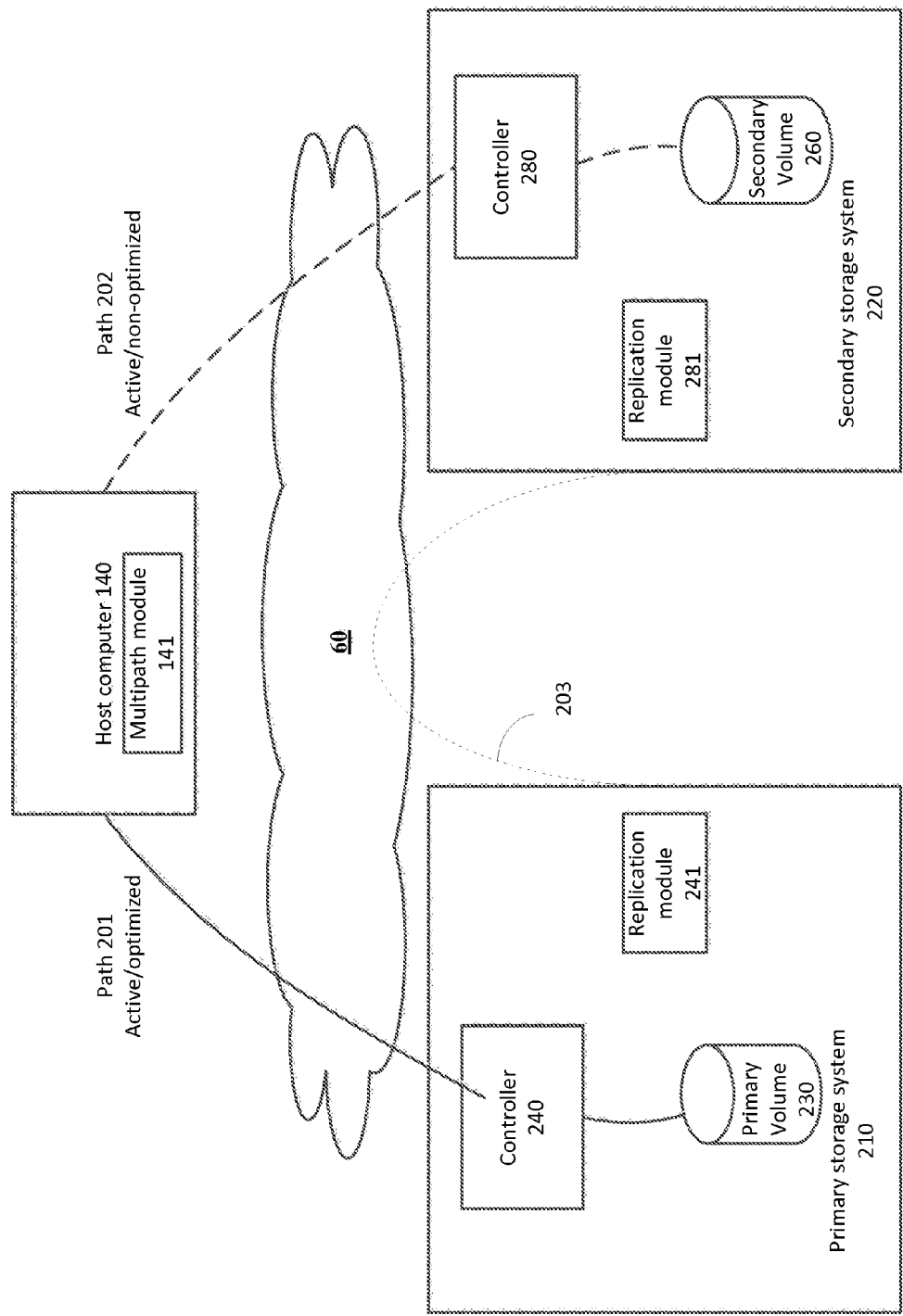
FIG. 2 illustrates a host computer, a primary storage system and a secondary storage system according to an embodiment of the invention.

FIG. 2 illustrates primary storage system 210, secondary storage system 220, network 60, primary path 201, secondary path 202 and host computer 140 according to an embodiment of the invention.

FIG. 2 illustrate a state before a failover or after a failback. The primary path 201 is active and optimized while the secondary path 202 is active and non-optimized. FIG. 2 also illustrates a path 203 between primary and secondary storage systems. Path 203 may be referred to as a replication link.

There are usually multiple primary paths and multiple secondary paths from the host to each volume or group of volumes—but for simplicity of explanation only one primary path and only one secondary paths are shown. The primary and secondary storage systems are illustrated as having controllers (240 and 280 respectively), interfaces (251 and 252 respectively) and replication modules (241 and 281 respectively).

Host computer 140 accesses primary volume 230 in primary storage system 210 via the primary path 201. The interfaces 251 and 252 are communication interfaces that may exchange signals between the primary and secondary storage systems and host computers.

Host computer 140 also sees secondary volume 260 in remote system 220 via secondary path 202. Host computer 140 is not aware that secondary volume 260 is a different volume, in a different location. The host computer sees the two volumes 230 and 260 as one volume with paths of different states. The two volumes 230 and 260 may be nonvolatile volumes or may be stored in non-volatile volumes.

Failover

When the primary storage system fails or cannot communicate with the host computer, the host computer senses that all paths from the host computer to the primary volume(s) are not active. As part of the multipathing techniques implemented in the host computer, the host computer will retry the non-responded commands on the active and non-optimized paths, reaching the secondary storage system, without being aware of this redirection. The host computer is not aware that its IO requests, when using the active and non-optimized paths, are actually directed to a different volume, different storage, in a different site. From the perspective of the host computer, this is only a path failure, which can be handled by known multipathing techniques for handling switching between paths.

Figure 3:
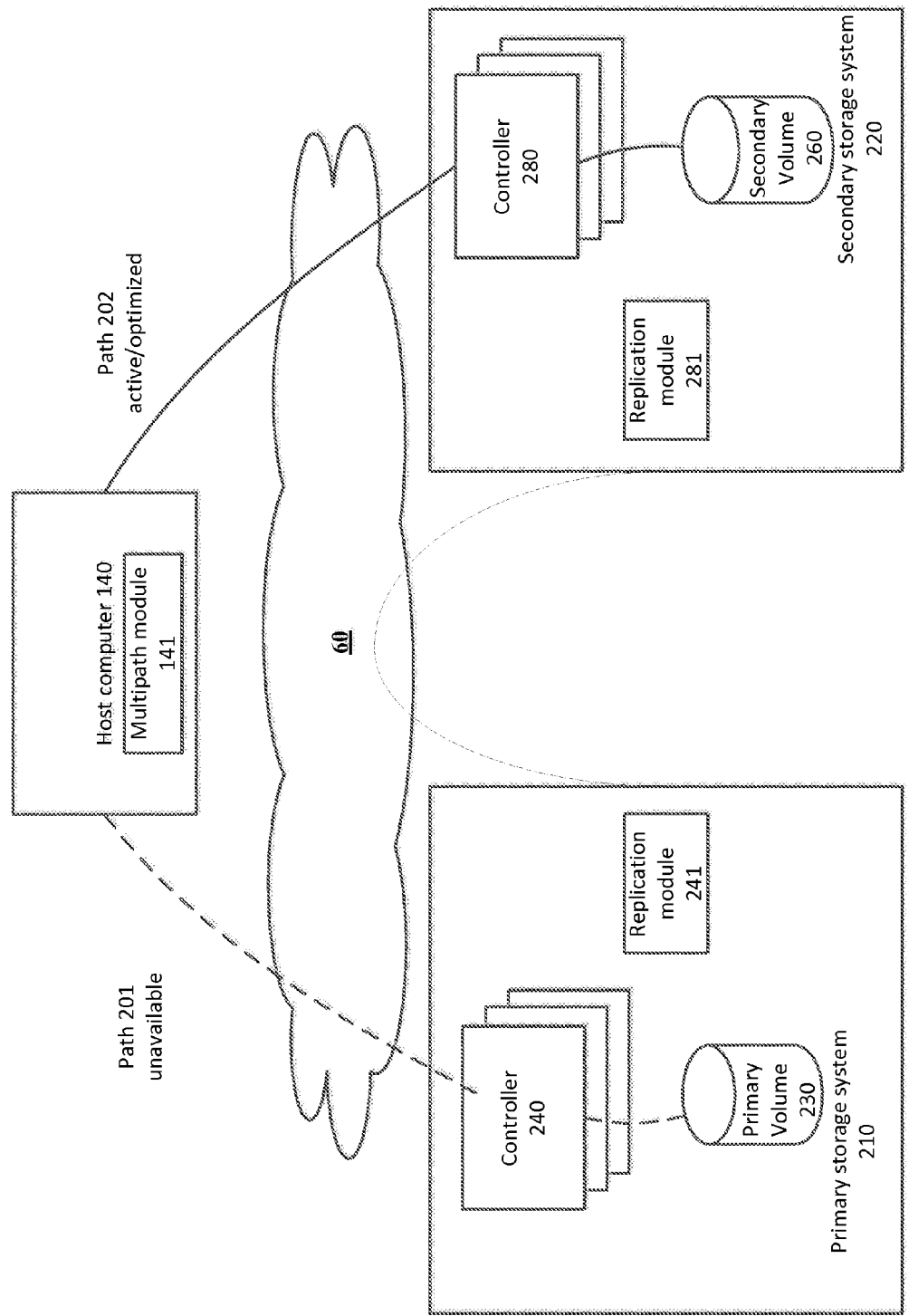
FIG. 3 illustrates a host computer, a primary storage system and a secondary storage system according to an embodiment of the invention.
Figure 4:
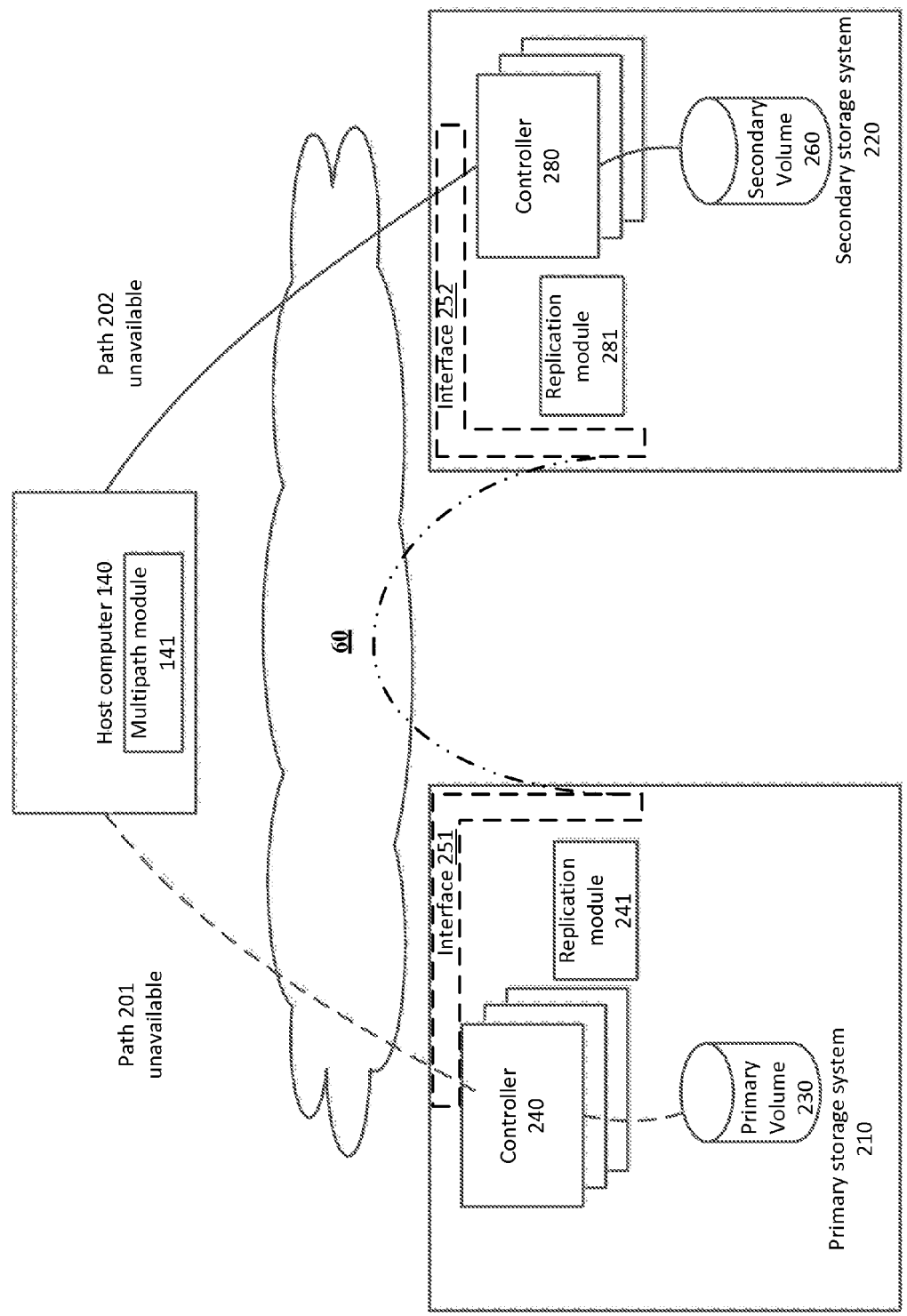
FIG. 4 illustrates a host computer, a primary storage system and a secondary storage system according to an embodiment of the invention.

FIG. 3 illustrate a state after a failover and before a failback. The primary path 201 is disconnected while the secondary path 202 is active and optimized. Also—FIG. 3 illustrates a single controller per storage system—but this is not necessarily so. Any controller may include hardware components. It may include one or more general purpose processors, digital signals processors, central processing computers, controller chips, and the like.

According to embodiments of the present invention, the role-transition from the primary storage system to the secondary storage system is performed automatically, without intervention of a system administrator for re-configuring the remote system as the primary system by implementing the following approach.

During normal operation, the secondary storage system is not supposed to receive IO requests from the host computer. Thus, once the secondary storage system receives such an IO request (SCSI command), it can determine that the primary storage system is not reachable to the host computer. In such a situation, the secondary storage system may take over (may perform a failover).

In some scenarios, the secondary storage system may not be synchronized with the failed primary storage system and in such situations it should not become the primary storage system so as to avoid causing the host computer to access inconsistent data. An example of such scenario: suppose the replication connection between the primary and the secondary storage system failed prior to the failure of the primary storage system, which halts the mirroring process. The secondary storage system becomes non-synchronized. Then the primary storage system fails. In such a situation, the non-synchronized secondary storage system should not become the primary system.

In order to avoid the above problem, the secondary storage system, may constantly check (or check at a frequency that is high enough to guarantee a sufficient level of synchronicity) the connectivity with the primary storage system (especially with the replication module of the primary storage system).

When the secondary storage system detects a disconnection with the primary storage system (or with the replication module of the primary storage system), it may start measuring the time passed since the disconnection.

If within a certain time period (for example e.g., 10 seconds), since the disconnection, an IO request is received by the secondary storage system and from the host computer, the secondary storage system can determine that the disconnection is due to a failure of the primary storage system (rather than just link failure between the two storage systems) and that the synchronization is still preserved.

In this case the secondary storage system will take-over the primary role, by assigning all its paths to "active and optimized".

From now on and until a failback occurs, the host computer will send IO requests directly to the secondary storage, via paths that are now defined as active and optimized, without attempting to try sending to the failed paths and then retry the non-optimized ports.

However, if no IO request has been received (although it was expected to be received) within a predefined time period (e.g., 10 seconds or any other period that should fit the expected patterns of IO requests from the host computer) from the disconnection of the replication link, the secondary storage system can assume that the primary storage system is alive, since otherwise IO requests would have been redirected to the secondary storage system immediately.

In such a case, the secondary storage system becomes non-synchronized with the primary storage system and it should block itself from receiving IO requests by transitioning all paths to "unavailable" state.

After the secondary storage system changes the status of its paths (either to "active and optimized" or "unavailable" state) the secondary storage system reports the path state change to the host computer. The change of status of the secondary paths to active and optimized is also referred to a failover update.

Since SCSI target ports cannot send unsolicited messages to the initiator ports, the state change notification can be done by establishing (by the secondary storage system) a unit attention condition (for example changing one or more predetermined bits in response to an IO request) sent for the initiator ports (of the host computer) with the additional sense code set to Asymmetric Access State Changed. When this attention is propagated to the host computer, the host computer will issue a Report Target Port Groups SCSI command and the secondary storage system will send the new access state in response.

According to an embodiment of the invention the secondary storage system may be arranged to a. Monitor the status of the connectivity with the primary storage system (for example—monitor the state of a replication line between the primary and secondary storage systems).

b. Upon detecting a disconnection between the primary and secondary storage systems, start counting time since disconnection.

c. Upon receiving from the host computer an IO request, if no disconnection was yet detected or the time elapsed since the disconnection is smaller than a threshold (set by allowable synchronization level between primary and secondary storage system)—changing the state of all its paths (secondary paths) to 'active and optimized state' and reporting to the host computer a new state of the paths. This results in participating in a failover.

d. Responding to any incoming IO request from the host computer.

e. When the time elapsed since the disconnection is larger than the threshold and no IO has been received since— changing the state of the secondary paths to unavailable and reporting to the host computer a new state of the secondary paths. In this situation, even if IO requests are received, the secondary storage system does not respond.

f. Upon being notified that the primary storage system returned to full-operation-state (including re-synchronize), changing the state of the secondary paths to active and non-optimized.

Failback

The failback may start after the primary storage system can properly response to new IO requests—after being disconnected. The primary storage system may be back to full operation mode and resynchronized with the secondary storage system.

Full operation of the primary storage system is defined when the following conditions are fulfilled: (i) at least one replication link between the local and secondary storage is active; (ii) all relevant volumes are resynchronized between the local and secondary storage systems (including volume reservation information).

Then the following steps are then taken:

a. Transitioning all the paths that end at the secondary storage system to "standby" state and stop responding to IO requests, while returning the responsibility to the primary storage system.

b. Informing the primary storage system to transition its paths to active and optimized state.

c. After receiving acknowledge from the primary storage system about successful transition, notifying the host computer about the change of the remote paths to 'standby', which will cause failing of pending IO requests at the host computer and retrying the pending IO requests through the active and optimized paths that now end at the primary storage system.

d. Receive confirmation from the primary storage system that the IO resumed at the active and optimized paths.

e. Transitioning all the secondary paths to active and non-optimized state and inform the host computer.

f. Informing the host computer about state changes may involve establishing a unit attention condition for the paths with the additional sense code set to Asymmetric Access State Changed. When this attention is propagated to host computer they will issue a Report Target Port Groups SCSI command, following which they will issue following SCSI commands on the active and optimized paths reaching the primary storage system.

Figure 5:
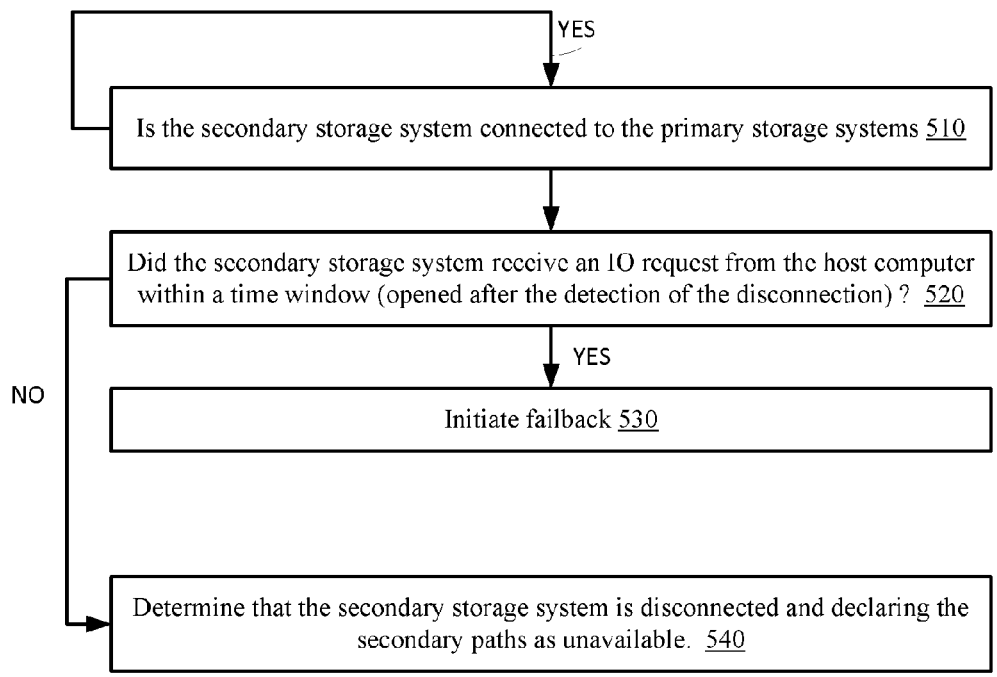
FIG. 5 illustrates a method according to an embodiment of the invention.

FIG. 5 illustrates method 500 according to an embodiment of the invention.

Method 500 may start by stage 510 of checking whether the secondary storage system is connected to the primary storage systems. Stage 510 may be done constantly or in a repetitive manner. This may include monitoring the communication between the primary and secondary storage systems, sending keep alive messages, and the like.

If the secondary storage system is connected to the primary storage systems then stage 510 is followed by itself—else stage 510 is followed by stage 520.

Stage 520 may include checking whether the secondary storage system receive an IO request from the host computer within a time window. The time window opened after the detection of the disconnection. The length of the time window is determined in view of an expected pattern of IO requests generated by the host computer towards the primary storage system. The time window should be long enough to guarantee (at least with a desired certainty level) that unless the secondary storage system is disconnected from the host computer—it should receive the IO request from the host computer.

If an IO request was received during that time window, stage 520 is followed by stage 530 of initiating a failback.

If an IO request was not received during that time window, stage 520 is followed by stage 540 of determining that the secondary storage system is disconnected and declaring the secondary paths as unavailable.

Figure 6:
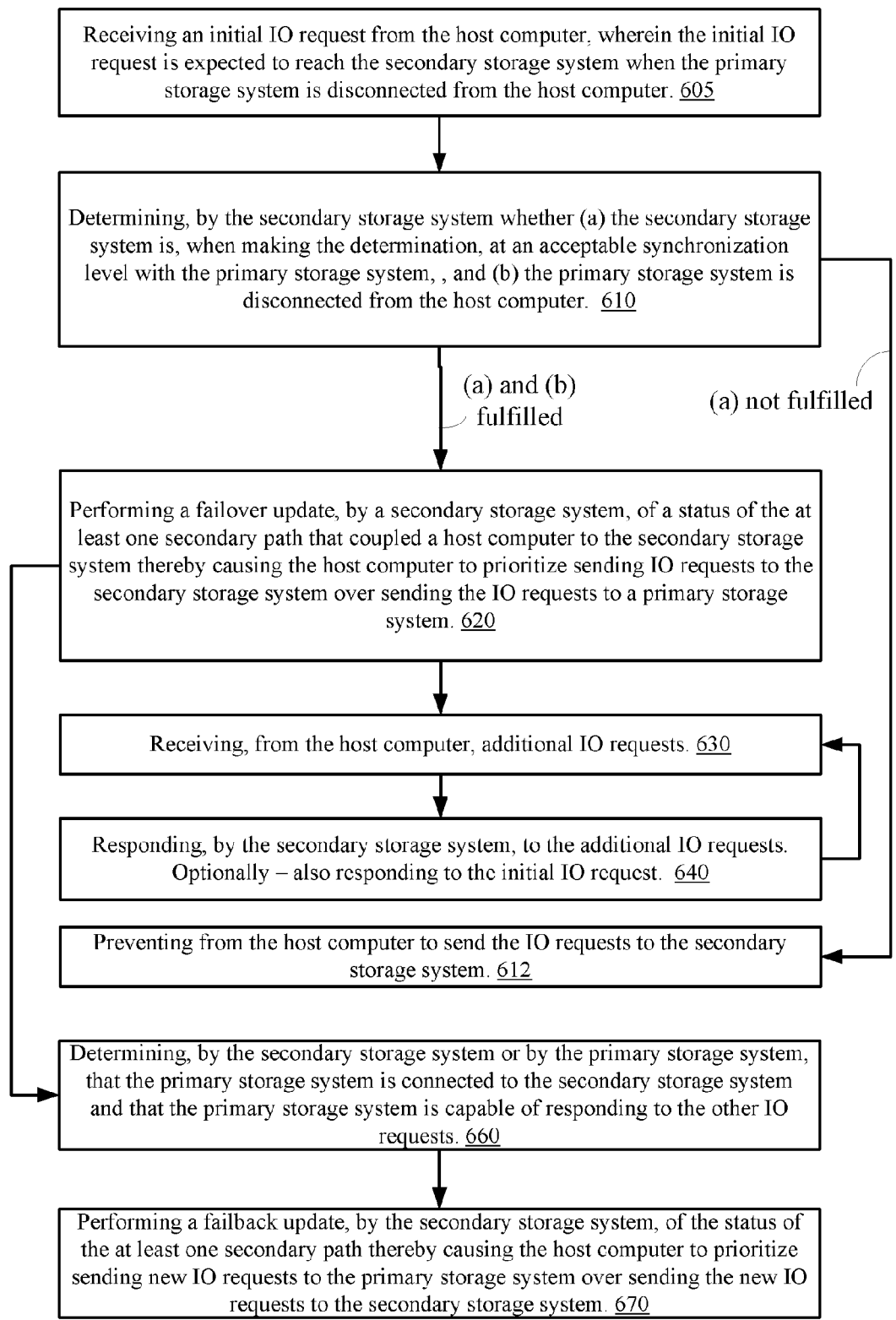
FIG. 6 illustrates a method according to an embodiment of the invention.

FIG. 6 illustrates method 600 according to an embodiment of the invention.

Method 600 may include stage 610 of determining, by the secondary storage system whether (a) the secondary storage system is, when making the determination, at an acceptable synchronization level with the primary storage system, and (b) the primary storage system is disconnected from the host computer. The outcome of stage 610 is also referred to as "the determination".

Stage 610 may include determining that the primary storage system is disconnected from the secondary storage system but the secondary storage system is maintained an acceptable synchronization level with the primary storage system when the primary storage system is disconnected from the secondary storage system. It is noted that stage 610 may be executed even before the secondary storage system is aware of a disconnection (if any) from the primary storage system and even if the primary storage system is connected to the secondary storage system.

The determining that the primary storage system is disconnected from the host computer may be based upon a reception (stage 605), before performing of the failover update, of an initial IO request from the host computer, wherein the initial IO request is expected to reach the secondary storage system when the primary storage system is disconnected from the host computer. The initial IO request is termed initial merely because it is received before the determination of stage 610. Any other indication that the primary storage system is disconnected from the host computer may also trigger stage 610.

Stage 610 may be followed by stage 620 of performing a failover update, by a secondary storage system, of a status of the at least one secondary path that couples a host computer to the secondary storage system thereby causing the host computer to prioritize sending IO requests to the secondary storage system over sending the IO requests to a primary storage system. The failover update may be triggered if determining (during stage 610) that conditions (a) and (b) are fulfilled.

Stage 620 may be followed by stage 630 of receiving, from the host computer, additional IO requests. The additional IO requests follow the initial IO request.

Stage 630 may be followed by stage 640 of responding, by the secondary storage system, to the additional IO requests. Stage 630 may also include responding to the initial IO request received during stage 605.

Stage 640 may be followed by stage 630.

According to an embodiment of the invention stage 610 may be followed by stage 612 if the secondary storage system was not properly synchronized (not of an acceptable synchronization level) with the primary storage system when the primary storage system disconnected from the secondary storage system.

Stage 612 may include preventing from the host computer to send the IO requests to the secondary storage system. This may include flagging the at least one secondary path as being inactive.

Stage 620 may be followed by stage 660 of determining, by the secondary storage system or by the primary storage system, that the primary storage system is connected to the secondary storage system and that the primary storage system is capable of responding to the new IO requests.

Stage 660 may be followed by stage 670 of performing a failback update, by the secondary storage system, of the status of the at least one secondary path thereby causing the host computer to prioritize sending new IO requests to the primary storage system over sending the new IO requests to the secondary storage system.

Stage 670 may include informing the host computer about a prioritization of the at least one primary path over the at least one secondary path after the primary storage system completed a failback change in the status of the at least one primary path.

In the text above it was assumed that a path associated with an active and optimized state is prioritized over a path associated with an active and non-optimized state. It is noted that these states are only non-limiting examples of active paths having different priority levels.

Any combination of any stages of method 500 and 600 may be provided. For example, stage 510 of method 500 may be followed by either one of stages 612 and 660 of FIG. 6.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (IO) devices. When executing the computer program, the computer system processes information according to the computer program and produces resultant output information via IO devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for managing a secondary storage system, the method comprises:
   performing a failover update, by the secondary storage system, of a status of at least one secondary path that couples a host computer to the secondary storage system thereby causing the host computer to prioritize sending input output (IO) requests to the secondary storage system over sending the IO requests to a primary storage system;
   wherein the failover update is triggered by a determination made by the secondary storage system that (a) the secondary storage system is, when making the determination, at an acceptable synchronization level with the primary storage system, and (b) the primary storage system is disconnected from the host computer;
   receiving, from the host computer, IO requests; and
   responding, by the secondary storage system, to the IO requests.

2. The method according to claim 1 wherein the failover update is performed autonomously and without human intervention.

3. The method according to claim 1 further comprising performing the determination that (a) the secondary storage system is, when making the determination, at the acceptable synchronization level with the primary storage system, and (b) the primary storage system is disconnected from the host computer.

4. The method according to claim 3 wherein the determining that the primary storage system is disconnected from the host computer is based upon a reception, before performing of the failover update, of an initial IO request from the host computer, wherein the initial IO request is expected to reach the secondary storage system when the primary storage system is disconnected from the host computer.

5. The method according to claim 1 wherein the updating of the status of the at least one secondary path comprises indicating that the at least one secondary path is active and of a higher priority than a priority of at least one primary path that couples the host computer to the primary storage system.

6. The method according to claim 1 further comprising preventing, from the host computer, to send the IO requests to the secondary storage system when determining that the secondary storage system did not maintain the acceptable synchronization level with the primary storage system when the primary storage system disconnected from the secondary storage system.

7. The method according to claim 6 wherein the preventing comprising flagging the at least one secondary path as being inactive.

8. The method according to claim 1 further comprising performing a failback update, by the secondary storage system, of the status of the at least one secondary path thereby causing the host computer to prioritize sending new IO requests to the primary storage system over sending the new IO requests to the secondary storage system;
   wherein the performing of the failback update is triggered by a determination made by the secondary storage system that the primary storage system is connected to the secondary storage system and that the primary storage system is capable of responding to the new IO requests.

9. The method according to claim 8 wherein the performing of the failback update comprises informing the host computer about a prioritization of the at least one primary path over the at least one secondary path after the primary storage system completed a failback change in the status of the at least one primary path.

10. A non-transitory computer readable medium that stores instructions that once executed by a secondary storage system causes the secondary storage system to:
    perform a failover update of a status of at least one secondary path that couples a host computer to the secondary storage system thereby causing the host computer to prioritize sending IO requests to the secondary storage system over sending the TO requests to a primary storage system;
    wherein the failover update is triggered by a determination made by the secondary storage system that (a) the secondary storage system is, when making the determination, at an acceptable synchronization level with the primary storage system, and (b) the primary storage system is disconnected from the host computer;
    receive, from the host computer, IO requests; and
    respond, by the secondary storage system, to the IO requests.

11. The non-transitory computer readable medium according to claim 10 wherein the failover update is performed autonomously and without human intervention.

12. The non-transitory computer readable medium according to claim 10 that stores instructions for performing the determination that (a) the secondary storage system is, when making the determination, at an acceptable synchronization level with the primary storage system, and (b) the primary storage system is disconnected from the host computer.

13. The non-transitory computer readable medium according to claim 12 that stores instructions for determining that the primary storage system is disconnected from the host computer based upon a reception, before performing of the failover update, of an initial TO request from the host computer, wherein the initial IO request is expected to reach the secondary storage system when the primary storage system is disconnected from the host computer.

14. The non-transitory computer readable medium according to claim 10 that stores instructions for updating of the status of the at least one secondary path by indicating that the at least one secondary path is active and of a higher priority than a priority of at least one primary path that couples the host computer to the primary storage system.

15. The non-transitory computer readable medium according to claim 10 that stores instructions for preventing from the host computer to send the IO requests to the secondary storage system when determining that the secondary storage system did not maintain the acceptable synchronization level with the primary storage system when the primary storage system disconnected from the secondary storage system.

16. The non-transitory computer readable medium according to claim 15 that stores instructions for preventing from the host computer to send the IO requests to the secondary storage system by flagging the at least one secondary path as being inactive.

17. The non-transitory computer readable medium according to claim 10 that stores instructions for performing a failback update of the status of the at least one secondary path thereby causing the host computer to prioritize sending new IO requests to the primary storage system over sending the new IO requests to the secondary storage system; wherein the performing of the failback update is triggered by a determination made by the secondary storage system that the primary storage system is connected to the secondary storage system and that the primary storage system is capable of responding to the new IO requests.

18. The non-transitory computer readable medium according to claim 7 that stores instructions for performing of the failback update by informing the host computer about a prioritization of the at least one primary path over the at least one secondary path after the primary storage system completed a failback change in the status of the at least one primary path.

19. A storage system that comprises a controller and an interface; wherein the controller is configured to perform a failover update of a status of at least one secondary path that couples a host computer to the secondary storage system thereby causing the host computer to prioritize sending IO requests to the secondary storage system over sending the IO requests to a primary storage system; wherein the failover update is triggered by a determination made by the secondary storage system that (a) the secondary storage system is, when making the determination, at an acceptable synchronization level with the primary storage system, and (b) the primary storage system is disconnected from the host computer; wherein the interface is arranged to receive, from the host computer, IO requests; and wherein the storage system is configured to respond to the IO requests.

* * * * *